US005390251A

United States Patent [19]

Pastor et al.

[11] Patent Number: 5,390,251

[45] Date of Patent: Feb. 14, 1995

[54] MAIL PROCESSING SYSTEM INCLUDING DATA CENTER VERIFICATION FOR MAILPIECES

[75] Inventors: Jose Pastor, Medinaceli, Spain; George M. Brookner, Norwalk, Conn.; Robert A. Cordery, Danbury, Conn.; Hyung-Kun P. Kim, Wilton, Conn.

[73] Assignee: Pitney Bowes Inc., Stamford, Conn.

[21] Appl. No.: 133,427

[22] Filed: Oct. 8, 1993

[51] Int. Cl.$^{6}$ ....... H04L 9/02

[52] U.S. Cl. ....... 380/21; 380/28; 380/51; 364/464.02

[58] Field of Search ....... 380/21, 28, 29, 43, 380/51; 364/464.02

[56] References Cited

U.S. PATENT DOCUMENTS

| | | | |
|---|---|---|---|
| 4,203,166 | 5/1980 | Ehrsam et al. | 380/29 |
| 4,376,299 | 3/1983 | Rivest | 364/464.02 X |
| 4,634,808 | 1/1987 | Moerder | 380/29 |
| 4,641,346 | 2/1987 | Clark et al. | 380/51 X |
| 4,649,266 | 3/1987 | Eckert | 380/51 X |
| 4,757,537 | 7/1988 | Edelmann et al. | 380/51 |
| 4,934,846 | 6/1990 | Gilham | 364/464.02 X |

*Primary Examiner*—Tod R. Swann

*Attorney, Agent, or Firm*—Charles G. Parks, Jr.; Melvin J. Scolnick

[57] ABSTRACT

A system for controlling the validity of printing of indicias on mailpieces from a potentially large number of users of postage meters includes apparatus disposed in each said postage meter for generating a code and for printing the code on each mailpiece. The code is an encrypted code representative of the postage meter apparatus printing the indicia and other information uniquely determinative of the legitimacy of postage on the mailpieces. The keys for the code generating apparatus are changed to change its code generation at predetermined time intervals in each of the meters. A security center includes apparatus for maintaining a security code database and for keeping track of the keys for generating security codes in correspondence with the changes in each generating apparatus and the information printed on the mailpiece by the postage meter apparatus for comparison with the code printed on the mailpiece. There may be two codes printed, one used by the Postal Service for its security checks and one by the manufacturer. The encryption key may be changed at predetermined intervals or on a daily basis or for printing each mailpiece.

12 Claims, 11 Drawing Sheets

| PED ID | PS-DES POINTER | PS-DES (JULIAN DATE, POSTAGE, PIECE COUNT, PED ID) | VENDOR ECODE | | ERROR DETECTION |
|---|---|---|---|---|---|
| 1234567 | 89 | 01234567890123456789 | 012 | + | 2 |

68

| PED ID | PS-DES (JULIAN DATE, POSTAGE, PIECE COUNT, PED ID) | VENDOR ECODE | ERROR DETECTION |
|---|---|---|---|
| 1234567 | 01234567890123456789 | 012 | 9 |

| PED ID | PS-DES POINTER | JULIAN DATE | POSTAGE | PIECE COUNT | PS ENCODE | VENDOR ECODE | ERROR DETECTION |
|---|---|---|---|---|---|---|---|
| 1234567 | 89 | 01 | .0290 | 6789010 | 234 | 567 | 5 |

| PED ID | JULIAN DATE | POSTAGE | PIECE COUNT | PS ECODE | VENDOR ECODE | | ERROR DETECTION |
|---|---|---|---|---|---|---|---|
| 1234567 | 01 | .0290 | 6789010 | 234 | 567 | + | 2 |

68

FIG. 6
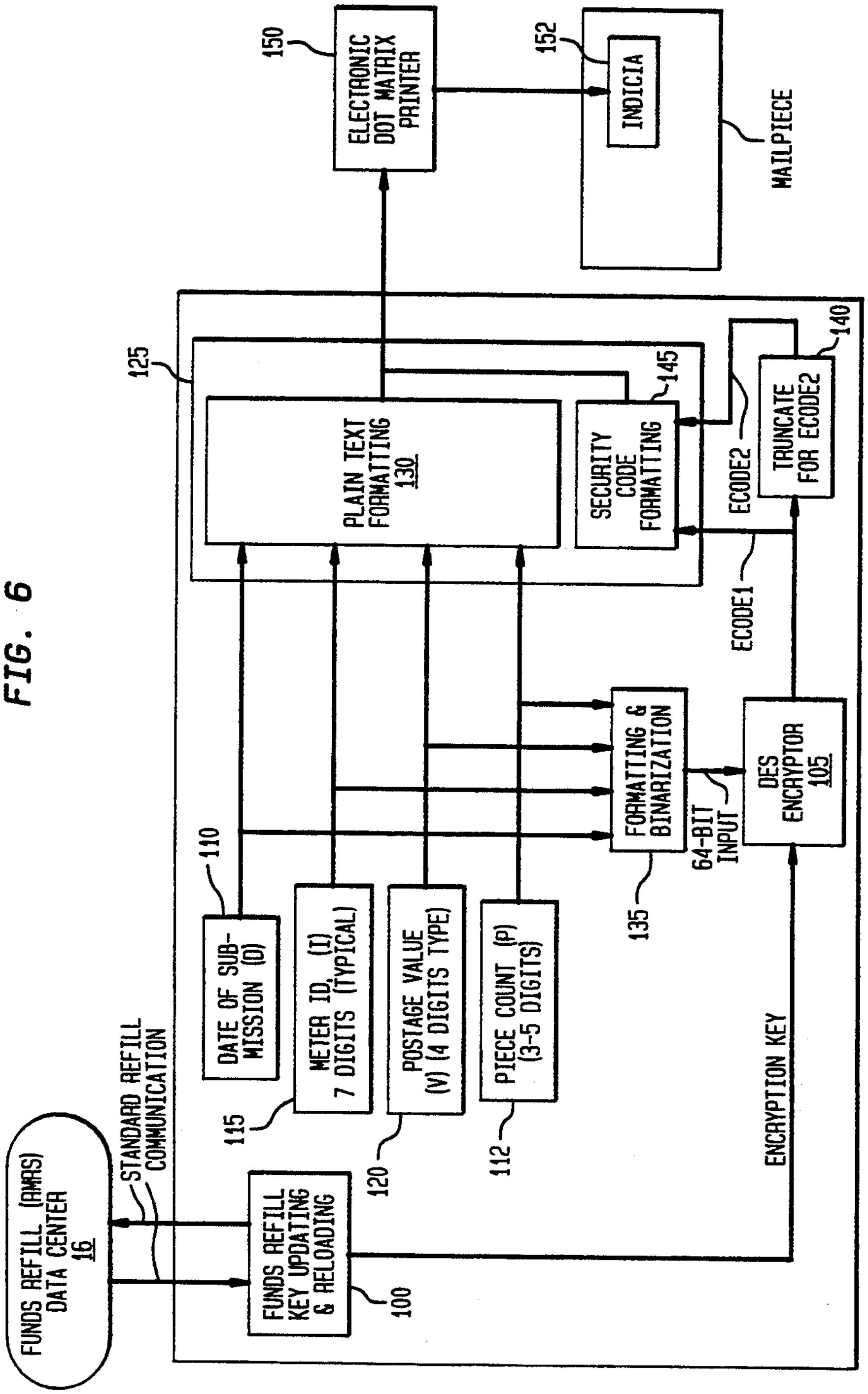
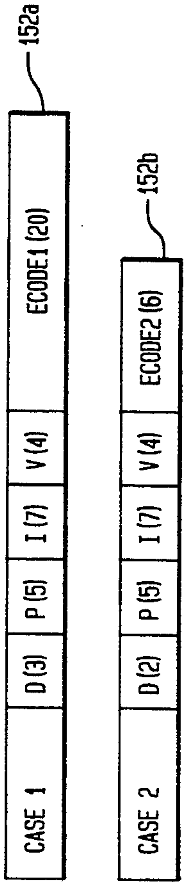
FIG. 6A
FIG. 6B

MAIL PROCESSING SYSTEM INCLUDING DATA CENTER VERIFICATION FOR MAILPIECES

FIELD OF THE INVENTION

The invention relates to mail processing systems and more particularly to security of postage metering systems.

BACKGROUND OF THE INVENTION

Digital printing technology has enabled mailers to implement digital, i.e., bit map addressable, printing in a convenient manner. It has been found to be desirable to use such techniques for the purpose of evidencing payment of postage. The computer driven printer can print, for example, a postal indicia in a desired location on the face of a mail piece.

Where it is necessary herein to distinguish such postage-meter-like devices from a typical postage meter, such devices will be called herein Postage Evidencing Devices or PED's. It should be understood, however, that the term "postage meter" as used herein will refer to both types.

Also as used herein a postal value bearing indicia will sometimes be called a Postal Revenue Block or PRB. The PRB typically contains data such as the postage value, a unique meter or PED identification number, the date and in some applications the name of the place where the mail is originating.

From the Post Office's point of view, it will be appreciated that the digital printing makes it fairly easy for someone to counterfeit a PRB since any suitable computer and printer may be used to generate multiple copies of the image.

In order to validate a mailpiece, that is to assure that accounting for the postage amount printed on a mailpiece has been properly done, it is known that one may include as a part of the franking an encrypted number such that, for instance, the value of the franking may be determined from the encryption to learn whether the value as printed on the mailpiece is correct. See, for example, U.S. Pat. Nos. 4,757,537 and 4,775,246 to Edelmann et al. as well as U.S. Pat. No. 4,649,266 to Eckert. It is also known to authenticate a mailpiece by including the address as a further part of the encryption as described in U.S. Pat. No. 4,725,718 to Sansone et al. and U.S. Pat. No. 4,743,747 to Fougere et al.

U.S. Pat. No. 5,170,044 to Pastor describes a system wherein include a binary array and the actual arrays of pixels are scanned in order to identify the provider of the mailpiece and to recover other encrypted plain text information. U.S. Pat. No. 5,142,577 to Pastor describes various alternatives to the DES encoding for encrypting a message and for comparing the decrypied postal information to the plain text information on the mailpiece.

U.K. 2,251,210A to Gilham describes a meter that contains an electronic calendar to inhibit operation of the franking machine on a periodic basis to ensure that the user conveys accounting information to the postal authorities. U.S. Pat. No. 5,008,827 to Sansone et al. describes a system for updating rates and regulation parameters at each meter via a communication network between the meter and a data center. While the meter is on-line status registers in the meter are checked and an alarm condition raised if an anomaly is detected.

While these implementations can work well, there has been no suggestion of how to implement any such concepts on a total system basis to make it practical for the large volumes of mail and large variable numbers of mailers which must be accommodated by the Postal Service.

SUMMARY OF THE INVENTION

It is an object of the invention to enable postal authorities to determine that a piece of mail taken from a large volume of mailpieces from different sources is carrying legitimate postage particularly when the indicia is printed using a computer printer.

It is another object to provide a method and apparatus for a mail system wherein the Postal Service can easily verify mailpieces arriving from a large number of different sources in order to assure itself that meters are properly accounting for mail introduced into the mail stream.

It is yet another object to provide a method and apparatus for a mail system wherein the vendor of the mail system is able to verify the authenticity of mailpieces using information independent of the Postal Service verification.

Thus the above and other objects are attained in a system for controlling the validity of printing of indicias on mailpieces from a plurality of users of respective postage meters of the type having computer means and a printer for printing an indicia on a mailpiece for indicating the amount of dispensed postage on the mailpiece, the system comprising apparatus disposed in each said postage meter for generating a code and for printing the code on each mailpiece using said printer, said code being an encrypted code representative of the postage meter apparatus printing the indicia and other information uniquely determinative of the legitimacy of postage on the mailpieces, each said code generating apparatus changing its code generation at predetermined time intervals in each of said plurality of postage meters, and a security center including apparatus for maintaining a security code database and for generating security codes in correspondence with the changes in each said generating apparatus and the information printed on the mailpiece by the postage meter apparatus for comparison with the code printed on the mailpiece.

In another aspect there is provided in a postage meter of the type having computer means and a printer for printing an indicia on a mailpiece for indicating an amount of dispensed postage on the mailpiece, the system comprising apparatus disposed in each said postage meter for generating a first and a second code and for printing the codes on each mailpiece using said printer, said codes being an encrypted code representative of the postage meter apparatus printing the indicia and other information uniquely determinative of the legitimacy of the amount of postage printed on the mailpiece.

FIGS. **3*a* and 3*b*** illustrate the information to be printed in a first embodiment of a PRB in accordance with the invention.

Figures 3A, 3B, 4A, 4B, 5:
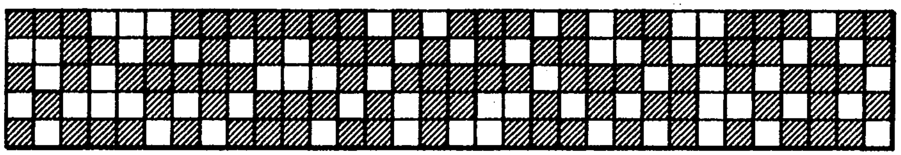

FIGS. **4*a* and 4*b* illustrate an alternative to the information shown in FIGS. 3*a* and 3*b***.

FIG. 5 illustrates a suitable barcode format.

FIG. 6 shows the meter printing arrangement for printing an ECODE using the same key between predetermined updates.

Figure 7:
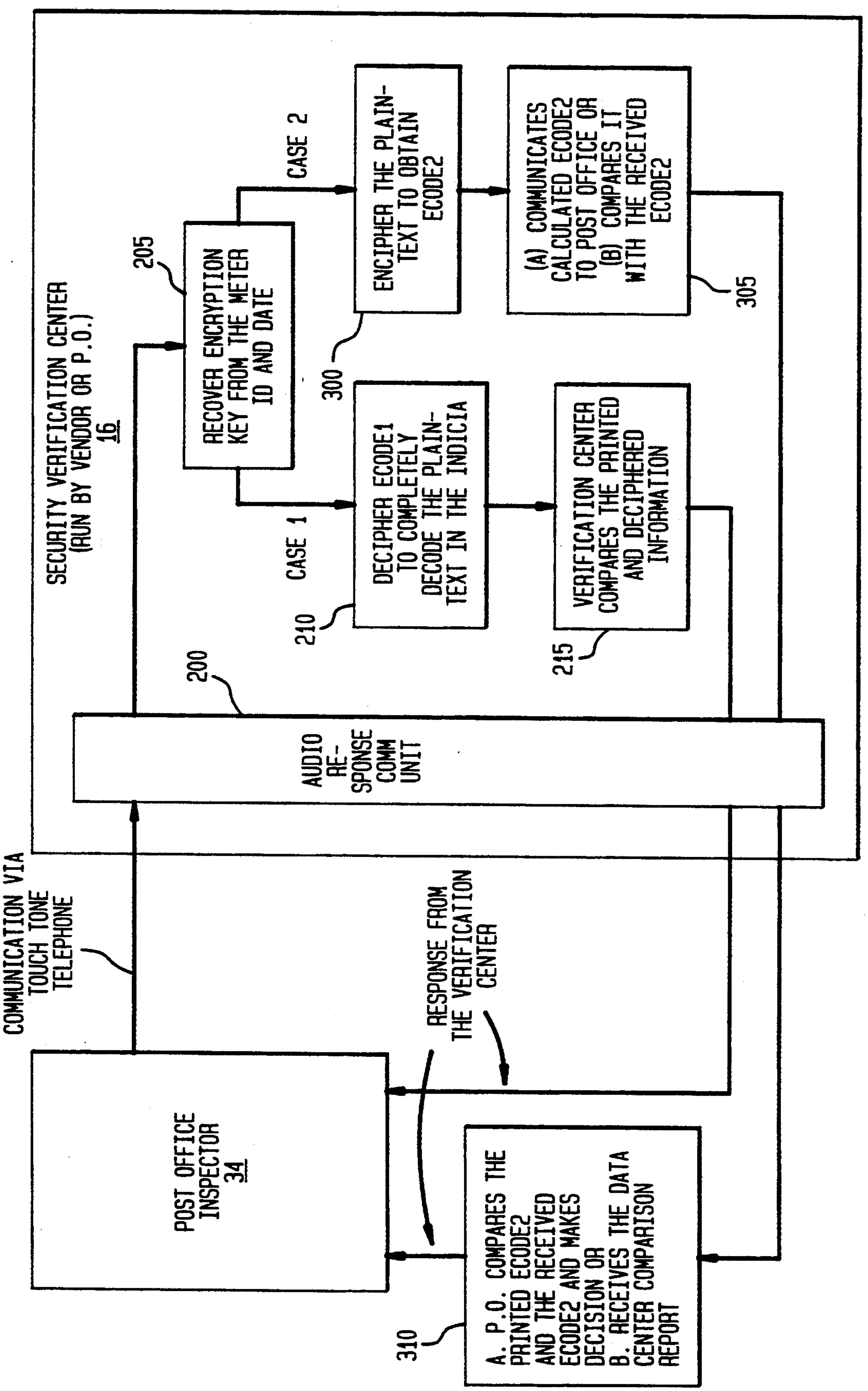

FIG. 7 is a block diagram of the verification process corresponding to the arrangement of FIG. 6.

Figures 8, 8A, 8B:
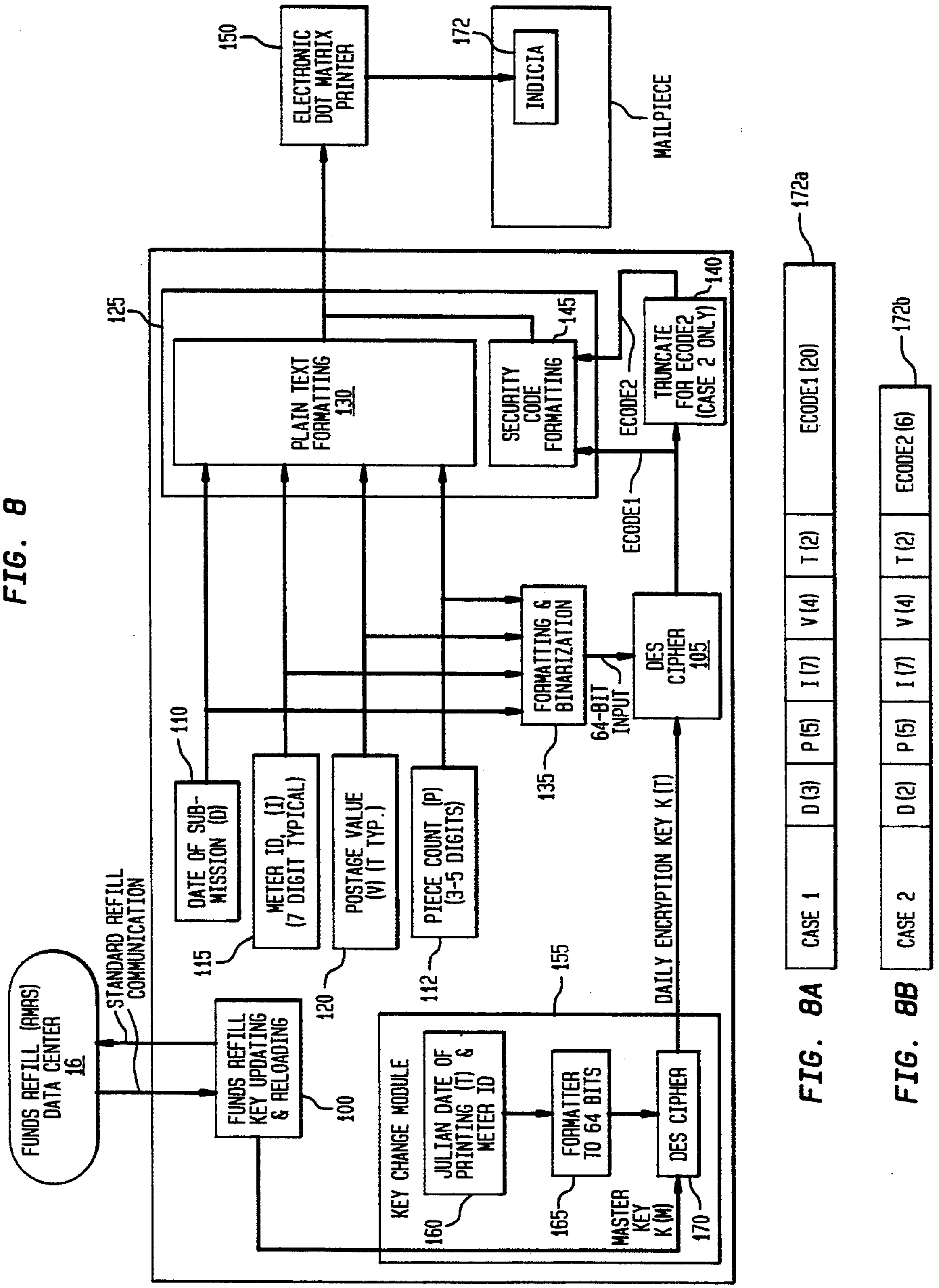

FIG. 8 is a block diagram of a meter arrangement for printing an ECODE using periodically-changed keys generated using a master key.

Figure 9:
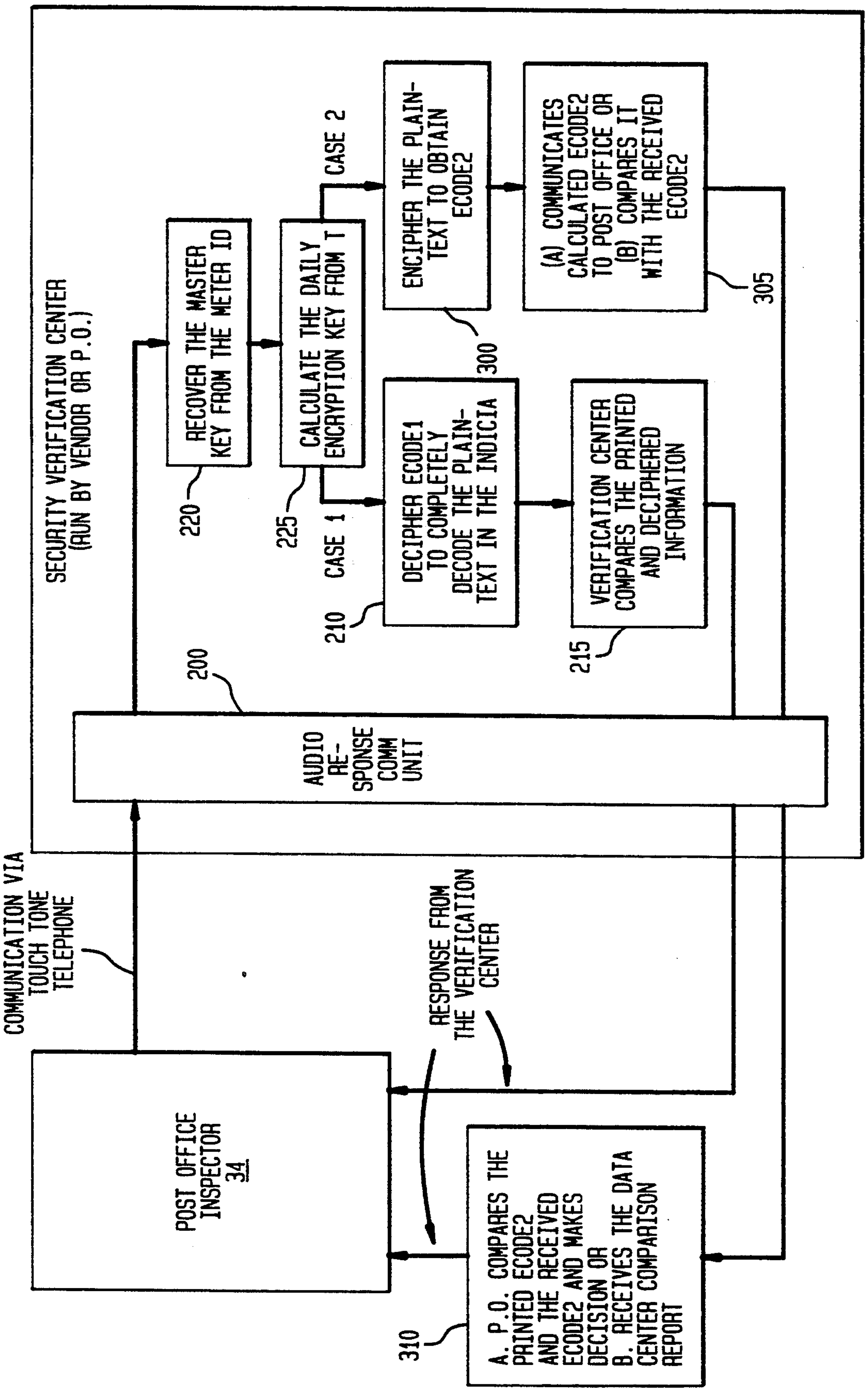

FIG. 9 is a block diagram of the verification using the keys as generated in the meter of FIG. 8.

Figure 10:
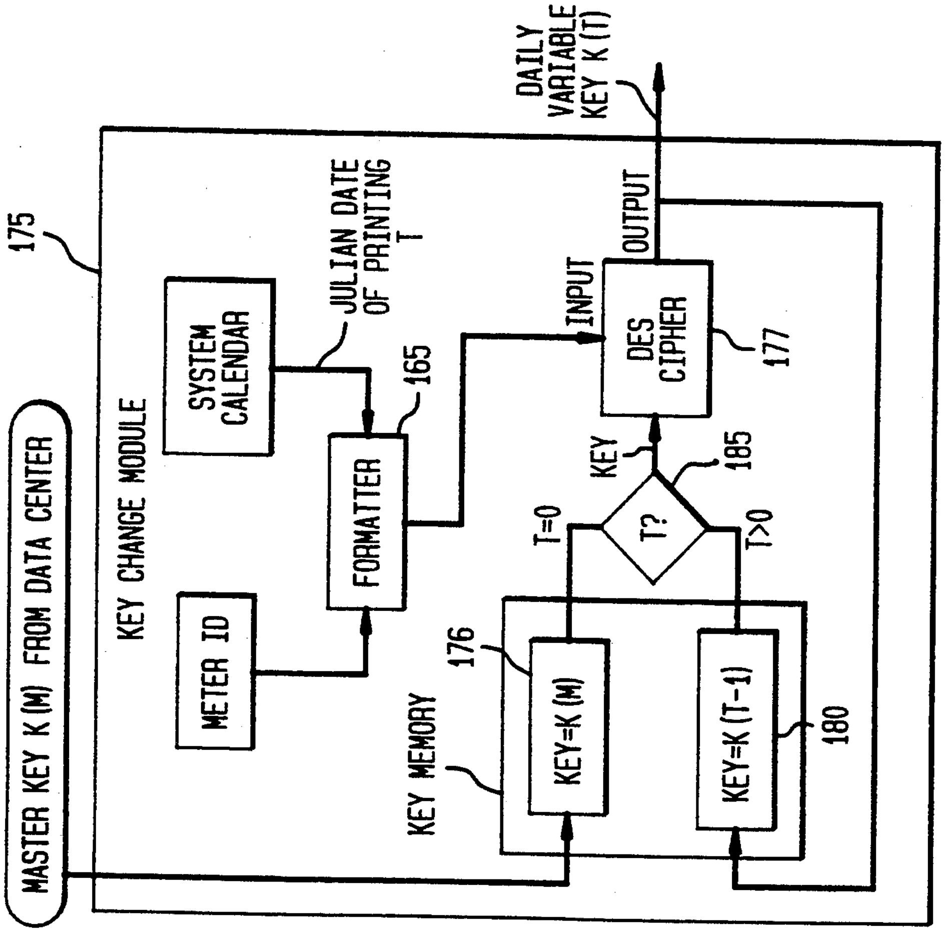

FIG. 10 shows a key change module where the key is changed daily using the previous day's key.

Figure 11:
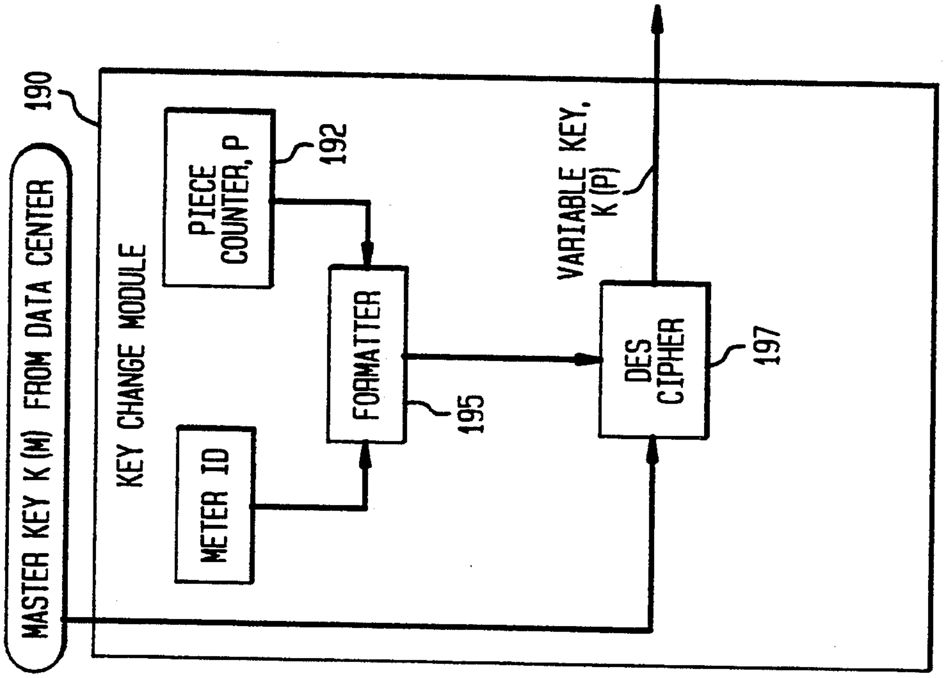

FIG. 11 shows a key change module where the key is changed after printing each envelope.

Figure 12:
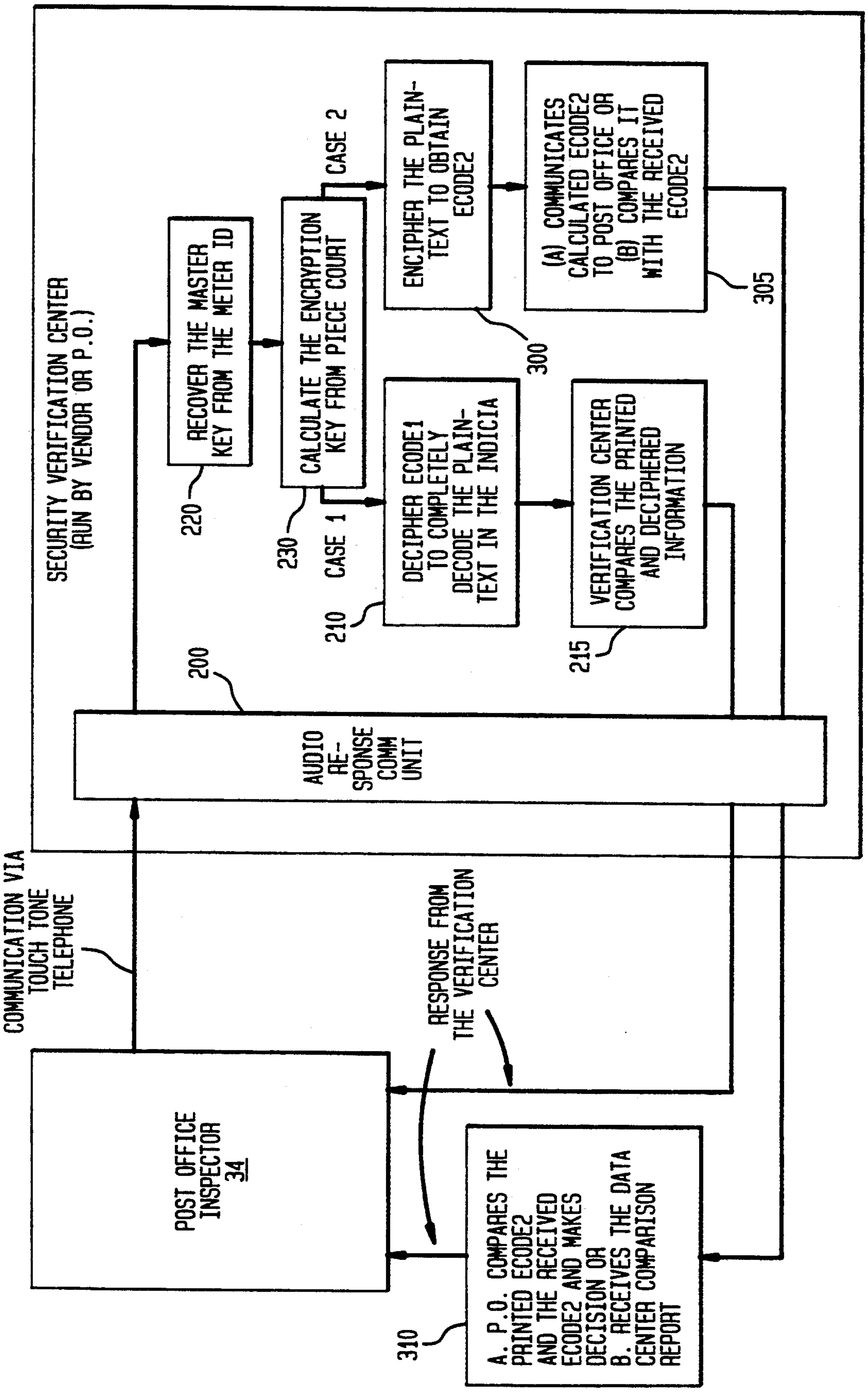

FIG. 12 is a block diagram of the verification using the keys as generated in the module of FIG. 11.

Figure 13:
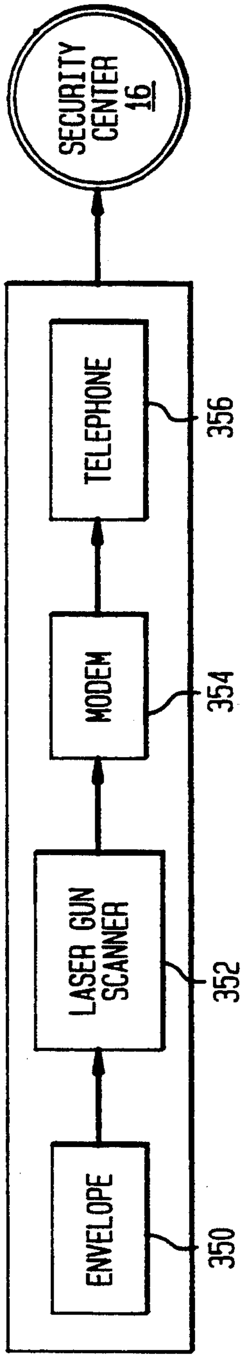

FIG. 13 shows an arrangement for automatic validation.

Figure 14:
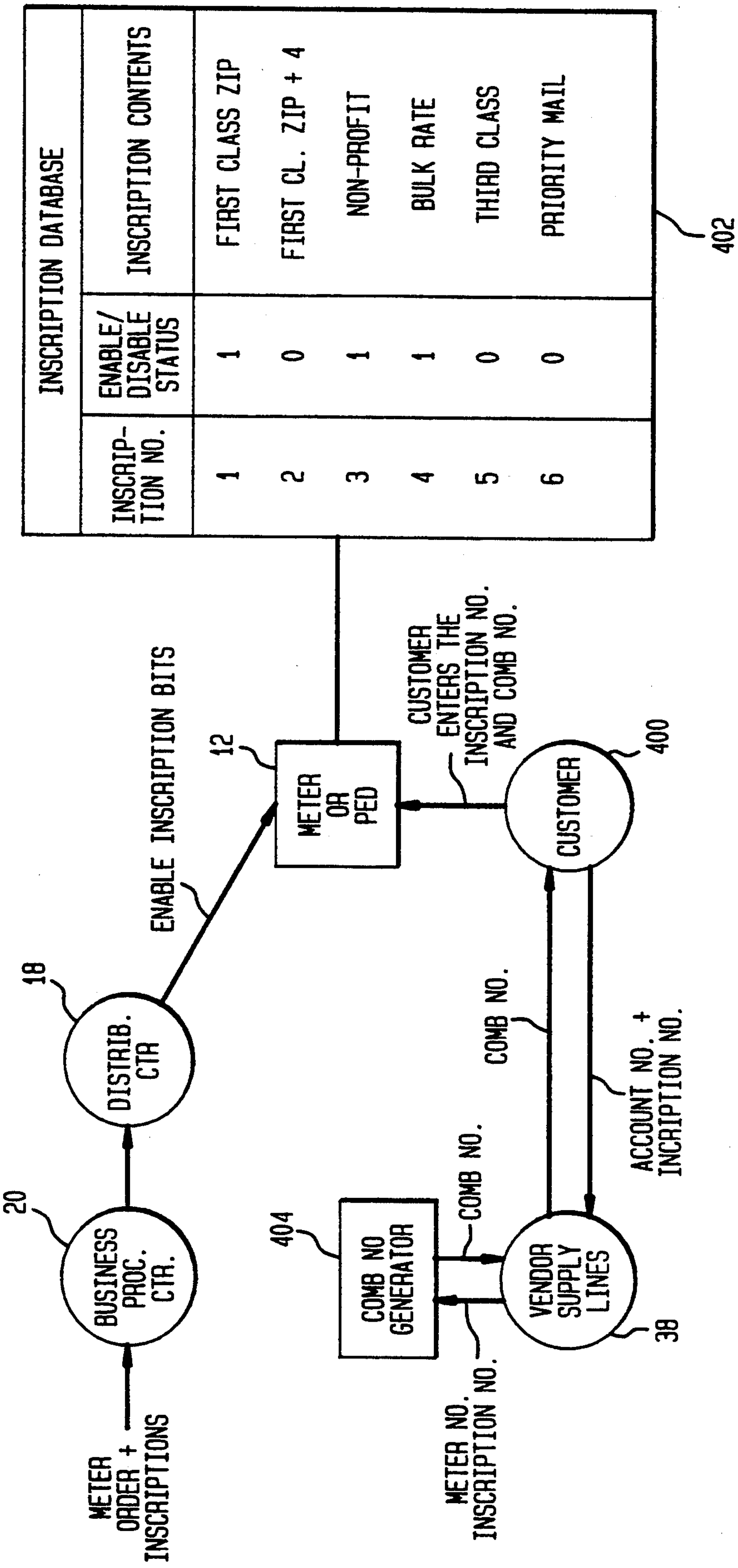

FIG. 14 illustrates an inscription enabling process.

DESCRIPTION OF THE PREFERRED EMBODIMENT

Figure 1:
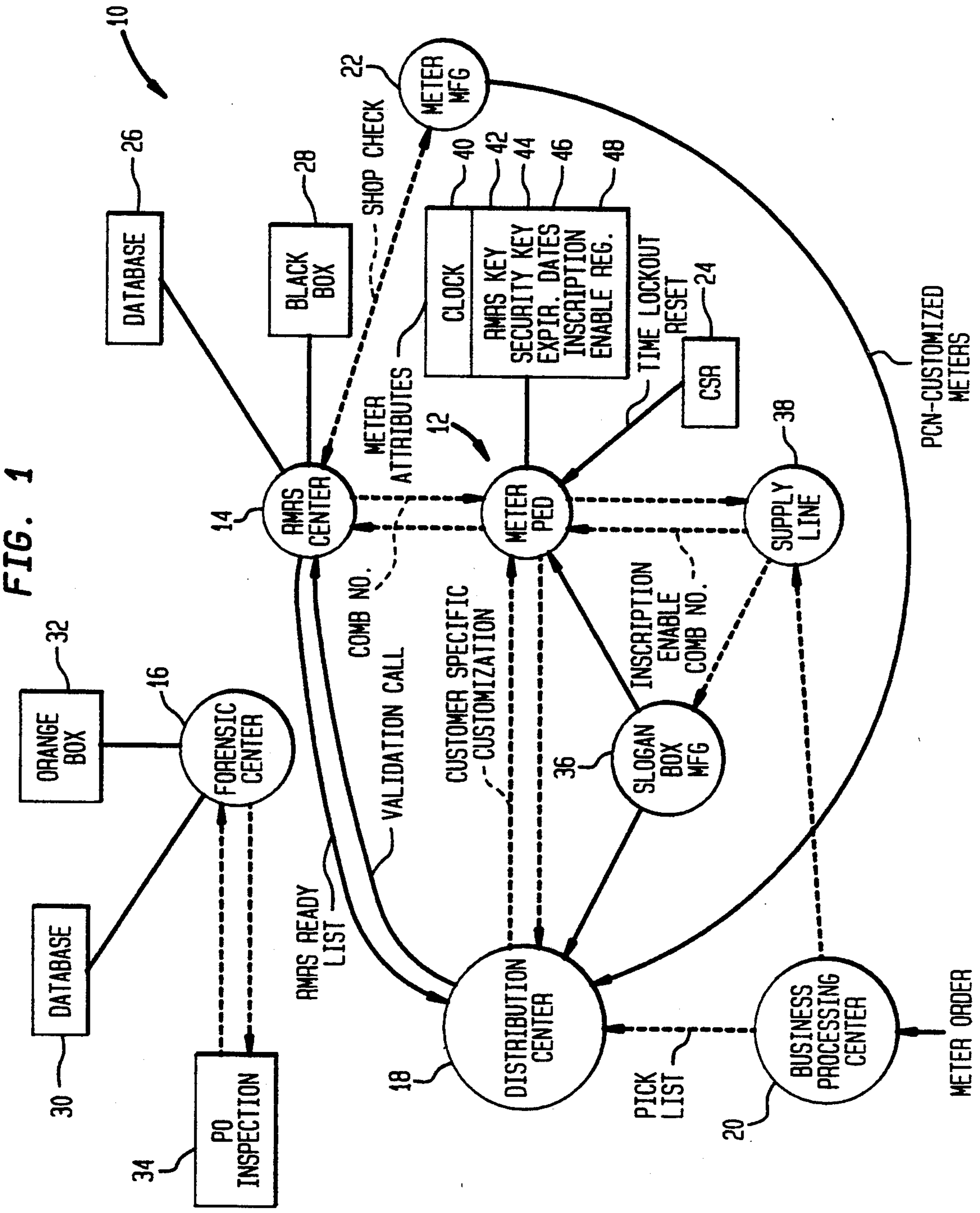
FIG. 1 is a schematic overall view of a system in accordance with the invention.

In FIG. 1, there is shown generally at 10 an overall system in accordance with the invention. In the embodiment illustrated, the system comprises a meter or PED 12 interacting with a plurality of different centers. A first center is a well-known meter-fund resetting center 14 of a type described, for example, in U.S. Pat. No. 4,097,923 which is suitable for remotely adding funds to the meter to enable it to continue the operation of dispensing value bearing indicia. In accordance with the invention there is also established a security or forensic center 16 which may of course be physically located at the fund resetting center 14 or associated with it, but is shown here separately for ease of understanding. Alternatively of course the illustrated security center could be an entirely separate facility maintained by the Postal Authorities, for instance, if desired. The dashed lines in FIG. 1 indicate communication, e.g. telecommunication, between the meter 12 and the funds resetting center 14 (and/or security or forensic center 16). Typically there is an associated meter distribution center 18 which is utilized by a manufacturer or vendor to simplify the logistics of placing meters with respective users. Similarly, a business processing center 20 may be utilized for the purpose of processing orders for meters and for administration of the various tasks relating to the meter population as a whole.

The meter manufacturer indicated at 22 provides customized meters or PED's to the distribution center 18 after establishing operability of interactions with respective meters utilizing so-called "shop" checks between the manufacturer and the resetting center 14 and security center 16. The meter or PED has its lock-out times reset at the user's facility by a customer service representative during inspections as indicated here by the box 24.

At the funds resetting center 14 a database 26 relating to meters and meter transactions is maintained. The resetting combinations are generated by a secured apparatus labeled here as the BLACK BOX 28. The details of such a resetting arrangement are found in U.S. Pat. No. 4,097,923, specifically incorporated by reference herein and will not be further described here.

Database 30 and another secured cryptographic apparatus, designated here as ORANGE BOX 32, are maintained at the security or forensic center 16. The ORANGE BOX 32 preferably uses the DES standard encryption techniques to provide an encrypted output based on the keys and other information in the message string provided to it. Other encryption techniques are known and may be used in place of the DES standard if desired. The security center 16, wherever maintained, is preferably connected by telecommunication with any of a plurality of Post Office inspection stations, one of which is indicated here at 34.

In a preferred embodiment, there is provided a slogan box for the meter by a slogan box manufacturer indicated at 36 which enables the generation of a plurality of inscriptions and/or slogans by the PED or meter 12. The inscriptions and slogans may be enabled by the manufacturer and in a preferred embodiment, are also enabled by use of a combination provided at the manufacturer's supply line indicated at 38. The operation is discussed further in connection with FIG. 14 and further details are to be found in U.S. application Ser. No. 08/133,419, filed on Oct. 8, 1993 filed on even date herewith assigned to the assignee of the instant application and specifically incorporated by reference herein.

Returning now to the meter 12, as illustrated, the meter includes a clock 40 which is secure and which is used to provide a calendar function programmed by the manufacturer. Such clocks are well known and may be implemented in computer routines or in dedicated chips which provide programmable calendar outputs.

Also within the meter 12 are memory registers for storing a fund resetting key at 42, secret key(s) at 44, expiration dates at 46 and preferably, an inscription enable flag in register 48. Preferably, in order to prevent the breaking of the security codes to be printed by the postage meter, the security key is changed at predetermined intervals as discussed below.

Figure 2:
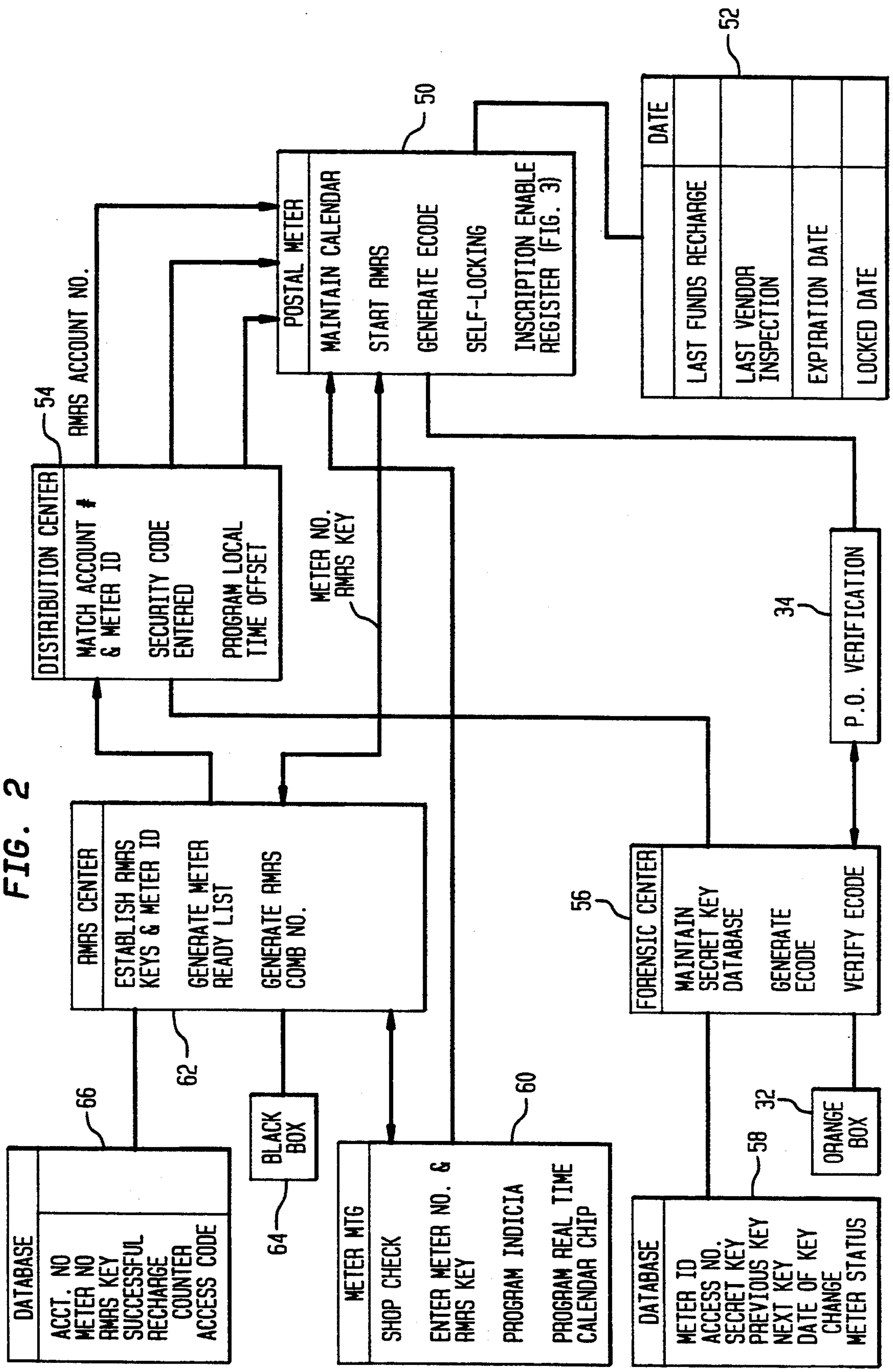
FIG. 2 is a functional block diagram of funds transfer and security code generation/verification in accordance with the invention.

FIG. 2 is a functional block diagram of the funds resetting and security code generation verification process. As previously described in connection with FIG. 1, the electronic postage meter or PED 12 includes a clock (not shown in this Fig.) and associated apparatus and/or computer routines for maintaining a calendar function as indicated in block 50 in this Figure. The other routines in block 50 provided within the meter 12 include the necessary meter fund resetting routines, routines for generating an encrypted number based on data uniquely attributable to a particular meter, called herein an ECODE, which are more completely described below and in U.S. application Ser. No. 08/133,416, filed on Oct. 8, 1993 herewith assigned to the assignee of the instant application and specifically incorporated by reference herein. In operation, the meter generates the ECODE for each mailpiece using the DES Standard and a unique key. The ECODE is then printed as part of the PRB. It has been found that for purposes of authentication, the resulting cipher may be truncated to some predetermined number of digits and this truncated number may be printed in place of the full cipher if desired. Both the full encryption and the truncated cipher will be called herein ECODES.

Preferably, the meter also includes routines for self-locking in the event that there has not been contact with a center within a predetermined time interval as described in U.S. application Ser. No. 08/133,420, filed on Oct. 8, 1993 herewith and assigned to the assignee of the instant application. In the preferred embodiment, an inscription enable register is disposed in the meter as further described in connection with FIG. 15.

The registers of the meter 12 suitably maintain information such as that illustrated in block 52 which may include selected data such as the date of the last funds recharge, the date of the last inspection, the expiration date and the date that the meter has become locked, as well as any other information that may be desired.

Block 54 illustrates the functions of the distribution center 18. At the distribution center, for each meter which is placed, the meter identification number is matched with the account number assigned to the meter, a meter secret key is entered and local time is programmed into the calendar. The initial secret key is provided to the security or forensic center 16 where as shown in block 56, the security code data base is maintained. Alternatively the security center could forward the initial key to the distribution center.

The data base as illustrated in block 58 may contain for each meter a Meter ID, an Access Number, the associated security key, the previous key, next key, date of key change, and the meter status. In conjunction with the orange box 32, the forensic center is capable of generating the identical ECODE which should have been printed on each mailpiece produced by that meter. While the ECODE generating routines operating in the ORANGE BOX can of course be implemented in a computer program in the forensic center, it has been found that the generation of such codes in a secure manner which is not available to manipulation by an operator in the center gives much greater security to the entire system since no one in such an arrangement is fully cognizant of all aspects of the code generation.

Thus at P.O. verification station 34 whenever a mailpiece which is allegedly from a particular mailer is to be checked, the information on the mailpiece is provided to the security center 16 and the expected ECODE is generated. A match indicates that the mailpiece franking is valid.

In order to initialize and verify operation of the meter 12, the meter manufacturer 22 performs the operations indicated at block 60. These include a shop check, programming of the desired indicia, and programming the calendar which will have only limited accessibility to the meter operator. It also includes the steps of entering a meter number and fund resetting key which is determined in conjunction with a communication with the funds resetting center 14 which provides the functions shown in block 62. The fund resetting center maintains the respective keys for each of the meters furnished by manufacturing to the distribution center and generates a meter ready list for the distribution center. As stated previously, in conjunction with the black box 64, the reset center provides combination numbers for the addition of funds to the meters already in service.

The data base maintained at the resetting center 14 is shown at block 66. Conventionally, the stored information includes an account number associated with each meter number, the fund reset key for each meter, a count of the number of times the meter has been successfully refilled with funds and the access code of the meter user.

Returning now to the operation of the Post Office verification station, if automatic checking of the ECODE is desired, both the ECODE and the plain text information must be machine-readable. A typical length of plain text message is, for example only and not by way of limitation, the sum of the meter ID (typically 7 digits), a date (2 digits, for convenience for example, the last 2 digits of the number of days from a predetermined starting date such as January 1), the postage amount (4 digits), and the piece count for a typical total of 16 digits. Reading devices for lifting the information either from a bar-code on the mailpiece or as OCR are well-known and a bar-code scanning arrangement will be further discussed in connection with FIG. 15.

A DES block is conventionally 64-bits long, or approximately 20 decimal digits. A cipher block is an encryption of 64 bits of data. It will be appreciated that other information may be selected and that less than the information provided here may be encrypted in other embodiments of the invention. It is however important to note that the information to be encrypted must be identical to that used in verification. To this end the plain text message and/or bar code may include data which indicates the particular information which is encrypted. This may take the form of an additional number, additional bar coding or a marking such as the "+" on the mailpiece as indicated at 68 in FIGS. **3*a* and 4*b***. It will be understood that the marking may be placed on the mailpiece outside of the indicia area if desired.

For best results, in accordance with one aspect of the invention, a second ECODE could be generated using a DES key, for example, from a set of keys, PS-DES, known to the Postal Service. Alternatively the Postal Service could elect to manage its own set of keys as described in connection with the key management system described below or as disclosed, for example, in U.S. application Ser. No. 08/133,416.

The plain text information may be encrypted using a PS-DES key chosen from the set PS-DES. The information included may be as shown in FIGS. **3*a* or 3*b***. The Postal Service then uses the same PS-DES key to decrypt the message. It will be appreciated that a second level of security is provided by including the second security center ECODE as part of the plain text information to be encrypted.

In a second embodiment, two ECODES are generated and printed on the mailpiece, one using a PS-DES key provided by the Postal Service and the other using a Vendor-DES key provided as described below, for example, by the manufacturer or security center. The Postal Service can then verify the message using its own code generating and key management system while the vendor can separately verify the validity of the message using the ECODE generated using its separate key system. FIGS. **4*a* and 4*b*** show a representative format of this second embodiment.

In the cases shown in FIGS. **3*a* and 4*a*, the postal service may obtain an encryption key using an index such as a pointer printed in the indicia. In the cases illustrated in FIGS. 3*b* and 4*b***, the postal service can obtain the key from the information in the indicia using a predetermined algorithm.

FIG. 5 illustrates a convenient barcode which has enough information for any of the previously discussed implementations, including error correction.

FIG. 6 shows the meter printing arrangement for printing an ECODE with the same key between predetermined updates such as when meter funds are reset or at other regular fixed intervals. In the embodiment as indicated at block 100, the DES key is downloaded to the meter at the time, for example, that funds are added to the meter. It will be understood that the time could be at other predetermined intervals but the essential feature is that the key will remain the same until another communication with the security center. The new DES key is stored for use in the DES encrypter in the meter as illustrated at block 105. As desired, the Date of Submission, block 112, which may be different from the date of printing, and Piece Counter information, block 112, which may be either a daily or cumulative piece count, Meter ID, block 115, and Postage Value information, block 120, are furnished to the Indicia Font block 125 for plain text formatting at block 130 as well as to block 135 for formatting into 64-bit block of information to be sent to the DES encrypter 105. The output of the encrypter 105 may either be truncated, if desired, at block 140, to produce an ECODE2 to be used for authentication or printed in full as an ECODE1. In this case it must be noted that typically one or the other of these codes, but not both, will be printed on the mailpiece. In either event, it is sent to block 145 of Indicia block 125 for incorporation into the indicia to be printed by electronic printer 150 at 152. At 152*a* there is illustrated representative indicia information incorporating ECODE1 which is suitable for recovery of the plain text information printed in the indicia. An alternative of the indicia is shown at 152*b*, where ECODE2 is illustrated.

FIG. 7 is a block diagram of the verification process corresponding to the printing arrangement of FIG. 6. When verification of a mailpiece by the postal authorities is desired a telephonic communication between the post office and the security center via communication unit 200 is initiated and the required information such as Meter ID, date, verification code and/or the postage plus other information is transmitted to the center. For completely automatic transactions a modem may be used. Alternatively, touch-tone or voice can be used to communicate the same information. The security center recovers the encryption key from its data base, block 205, and then depending on the format either decrypts ECODE1 to obtain the plain text information, block 210, and provides it to the verification center, block 215, where the legality is determined and the result transmitted to the Post Office, or enciphers the plain text for ECODE2 using the same secret key as was used in generating ECODE2 at the meter or PED, block 300, and communicates either the ECODE2 itself or compares it with the received ECODE2 at block 305 and notifies the inspector of the results, block 310.

FIG. 8 is a block diagram of a meter arrangement for printing an ECODE using periodically changed keys, for example, daily-changed keys generated using a master key. In this and succeeding figures the elements which are the same as in FIG. 6 are numbered the same as in FIG. 6. In this embodiment, the key provided to DES encrypter 105 is, as indicated in key change module 155, an encryption of, for example, the Julian date of printing as well as other predetermined fixed meter data such as the Meter ID, shown at block 160. The data is extended in predetermined manner to 64 bits in the formatter, block 165, and is encrypted at DES encrypter 170 for input as the key for encrypter 105. Thus it is apparent that the key is changed daily and the daily key K(T) is obtained as an encryption of some daily identifiable data such as the date of printing T. The resident master key in the meter is used until the next change of master key. The indicia printed at 172 using this arrangement requires additionally the inclusion of the Julian date of printing, preferably truncated to two (2) digits, as indicated in the information blocks illustrated for cases 1 and 2 at 172*a* and 172*b*.

FIG. 9 is a block diagram of the verification process using the keys as generated in the meter of FIG. 8. The security center 16 in this case must recover the Master Encryption Key, block 220, and calculate the encryption key from the date information, T, at block 225, to provide the key for use in determining validity. The other operations of the security center are as described in connection with FIG. 7 and will not be further described here.

FIG. 10 shows a key change module where the key is changed daily using the previous day's key to generate the new key, suitably, for example, by encryption of some daily identifiable data such as the Julian date of printing. As described in the previous embodiments, a master key is provided; however, in this case it is used as an input to encrypter 177 of key change module 175. On the day of reset, preferably, the encryption of this key by encrypter 177 is used as the key for DES encrypter 105 as seen in FIG. 8 but not shown here. On succeeding days, variable data for day "T" is incorporated, block 180, and the date information is tested to determine whether it is the reset date, block 185, and if not is used as that day's key DES encrypter 177 whose output furnishes the key for use in DES encrypter 105.

FIG. 11 shows a key change module at 190 where the key is changed after the printing of each envelope. In this embodiment, the variable information for the key is the piece count information, block 192, which is formatted along with the Meter ID at formatter 195 for encryption at encrypter 197 to provide the key K(P) for DES encrypter 105 not seen in this Figure.

FIG. 12 is a block diagram of the verification using the keys as generated in the module of FIG. 11. In this embodiment, the Post Office must provide the Meter ID and the piece count data. The encryption key is calculated, block 230, from the piece count and the master key in correspondence with the calculation at the key change module of FIG. 11.

FIG. 13 shows an arrangement for automating the communication with the security center. The envelope 350 is scanned by a scanner such as the laser gun scanner 352 which transmits the information to modem 354 connected to telephone 356 for communication to the security center 16.

FIG. 14 is a schematic diagram of the inscription enable process for a meter in accordance with the invention. The meter order is received at the business processing center 20. Included in the order is information as to the various ones of a plurality of inscriptions that the user wished to have made available for operation. The information is forwarded to the distribution center 18 which enables the desired inscription bits and forwards the meter to the customer indicated here at 400. A typical example of an inscription database is illustrated at 402 where the meter inscriptions No. 1 for FIRST CLASS ZIP, No. 3 for NON-PROFIT, and No. 4 for BULK RATE are shown as being enabled. It will be understood that any combination of choices is readily available and may be made by as desired and configured by the distribution center.

In order for the customer to change the inscriptions available for use without physically returning the meter or requiring a service representative to call on the customer, access to change the enabling status bits is controlled by the generation of combinations for the particular meter by combination generator 404. In order to accomplish the change, the customer calls the manufacturer supply line 38 giving the Account Number and the desired transcription number and in response, the customer is furnished a combination which when entered into the meter along with the inscription number will cause the appropriate corresponding enabling bit to change. In addition to the inscriptions shown, the process may be used to control the advertising slogans printed by the meter as more fully described in U.S. application Ser. No. 08/133,419, filed on Oct. 8, 1993, herewith and assigned to the assignee of the instant application.

What is claimed is:

1. A system for controlling the validity of printing of indicias on mailpieces from a plurality of users of respective postage meters of the type having computer means and a printer for printing an indicia on a mailpiece for indicating an amount of dispensed postage on the mailpiece, the system comprising apparatus disposed in each said postage meter for generating a code and for printing the code on each mailpiece using said printer, said code being an encrypted code representative of the postage meter apparatus printing the indicia and other information uniquely determinative of the legitimacy of the amount of postage printed on the mailpieces, each said code generating apparatus changing its code generation within predetermined intervals in each of said plurality of postage meters and a security center including apparatus for maintaining a security code database and for generating security codes in correspondence with the changes in each said code generating apparatus and the information printed on the mailpiece by the postage meter apparatus for comparison with the code printed on the mailpiece, an additional code is printed on the mailpiece and there is another security center for generating codes in correspondence with said additional code.

2. The system of claim 1 further comprising a meter fund resetting center for maintaining further information relating to the meter from which meter user information may be obtained.

3. The system of claim 1 wherein the apparatus for generation of secret keys at the security center is maintained in a secure manner separate from the security code database.

4. The system of claim 1 wherein the additional code is encrypted from data including the security code.

5. The system of claim 1 wherein the code generating apparatus changes its code generation at predetermined time intervals.

6. The system of claim 5 wherein the time interval is a daily time interval.

7. A system for controlling the validity of printing of indicias on mailpieces from a plurality of users of respective postage meters of the type having computer means and a printer for printing an indicia on a mailpiece for indicating an amount of dispensed postage on the mailpiece, the system comprising apparatus disposed in each Said postage meter for generating a code and for printing the code on each mailpiece using said printer, said code being an encrypted code representative of the postage meter apparatus printing the indicia and other information uniquely determinative of the legitimacy of the amount of postage printed on the mailpieces, each said code generating apparatus changing its code generation within predetermined intervals in each of said plurality of postage meters and a security center including apparatus for maintaining a security code database and for generating security codes in correspondence with the changes in each said code generating apparatus and the information printed on the mailpiece by the postage meter apparatus for comparison with the code printed on the mailpiece, the apparatus for generation of security codes comprises means for generating first and second codes using a respectively different key and wherein there are two separate security centers, each center being operative for comparison of only one of the respective first and second codes.

8. A system for controlling the validity of printing of indicias on mailpieces from a plurality of users of respective postage meters of the type having computer means and a printer for printing an indicia on a mailpiece for indicating an amount of dispensed postage on the mailpiece, the system comprising apparatus disposed in each said postage meter for generating a code and for printing the code on each mailpiece using said printer, said code being an encrypted code representative of the postage meter apparatus printing the indicia and other information uniquely determinative of the legitimacy of the amount of postage printed on the mailpieces, each said code generating apparatus changing its code generation within predetermined intervals in each of said plurality of postage meters and a security center including apparatus for maintaining a security code database and for generating security codes in correspondence with the changes in each said code generating apparatus and the information printed on the mailpiece by the postage meter apparatus for comparison with the code printed on the mailpiece, said other information on the mailpiece comprises data as to which information items are included in the encrypted code printed on the mailpiece.

9. The system of claims 1, 7 or 8 wherein the code generating apparatus code generation is changed for each successive mailpiece.

10. The system of claims 1, 7 or 8 wherein the code generating apparatus changes it code generation at the time of each inspection.

11. A system for controlling the validity of printing of indicias on mailpieces from a plurality of users of respective postage meters of the type having computer means and a printer for printing an indicia on a mailpiece for indicating an amount of dispensed postage on the mailpiece, the system comprising apparatus disposed in each said postage meter for generating a first and a second code and for printing the codes on each mailpiece using said printer, said codes being an encrypted code representative of the postage meter apparatus printing the indicia and other information uniquely determinative of the legitimacy of the amount of postage printed on the mailpieces, and a first security center and a second security center including apparatus for maintaining a security code database and for generating security codes in correspondence with each said code generating apparatus and the information printed on the mailpiece by the postage meter apparatus for comparison with the code printed on the mailpiece, each said center being operative for comparison of only one of the respective first and second codes.

12. The system of claim 11 wherein one of said first or said second codes is an encryption of information including the other code.

* * * * *